United States Patent
Dudar

(10) Patent No.: US 9,828,951 B2
(45) Date of Patent: Nov. 28, 2017

(54) SYSTEMS AND METHODS FOR OPPORTUNISTIC VEHICLE EVAPORATIVE EMISSIONS TEST DIAGNOSTIC

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 15/092,336

(22) Filed: Apr. 6, 2016

(65) Prior Publication Data

US 2017/0292475 A1 Oct. 12, 2017

(51) Int. Cl.
| | |
|---|---|
| F02M 25/08 | (2006.01) |
| F02D 41/00 | (2006.01) |
| F02D 41/22 | (2006.01) |
| F02D 41/14 | (2006.01) |
| F02D 9/02 | (2006.01) |

(52) U.S. Cl.
CPC ........... *F02M 25/0809* (2013.01); *F02D 9/02* (2013.01); *F02D 41/0032* (2013.01); *F02D 41/144* (2013.01); *F02D 41/22* (2013.01); *F02M 25/089* (2013.01); *F02M 25/0854* (2013.01); *F02D 2041/225* (2013.01); *F02D 2200/50* (2013.01); *F02D 2200/502* (2013.01); *F02D 2200/701* (2013.01); *F02D 2200/703* (2013.01)

(58) Field of Classification Search
CPC . F02M 25/08; F02M 25/0809; F02M 25/0827
USPC .......................................... 123/516, 518–520
See application file for complete search history.

(56) References Cited

U.S. PATENT DOCUMENTS

| | | |
|---|---|---|
| 3,311,106 A | 3/1967 | Baughman et al. |
| 4,276,864 A | 7/1981 | Waschkuttis |
| 5,193,262 A | 3/1993 | Hyde et al. |

(Continued)

OTHER PUBLICATIONS

Dudar, Aed M., "System and Methods for Controlling Fuel Vapor Canister Purge Operations," U.S. Appl. No. 15/004,600, filed Jan. 22, 2016, 56 pages.

(Continued)

*Primary Examiner* — Thomas Moulis
(74) *Attorney, Agent, or Firm* — James Dottavio; McCoy Russell LLP

(57) ABSTRACT

Methods and systems are provided for opportunistically conducting an evaporative emissions test diagnostic procedure in order to indicate the presence or absence of undesired evaporative emissions in a vehicle evaporative emissions control system and fuel system. In one example, tire pressure and barometric pressure are monitored, and responsive to a tire pressure decrease in the absence of a barometric pressure increase, along with an indication that the vehicle transmission is in neutral and that the vehicle is not traveling downhill, the evaporative emissions system and fuel system may be sealed and the presence or absence of undesired evaporative emissions indicated based on a vacuum-build. In this way, an opportunistic evaporative emissions test may be conducted based on conditions favorable to conducting an emissions test procedure, and may thus increase test completion rates and reduce undesired evaporative emissions.

20 Claims, 5 Drawing Sheets

(56) References Cited

U.S. PATENT DOCUMENTS

| | | | |
|---|---|---|---|
| 5,261,439 A * | 11/1993 | Harris | B60K 15/03519 |
| | | | 123/516 |
| 5,496,069 A | 3/1996 | Milligan | |
| 5,732,666 A | 3/1998 | Lee | |
| 6,003,498 A * | 12/1999 | Reddy | F02M 25/08 |
| | | | 123/516 |
| 6,401,961 B1 | 6/2002 | Butler | |
| 6,574,603 B1 * | 6/2003 | Dickson | G07C 5/0858 |
| | | | 235/381 |
| 7,559,391 B2 | 7/2009 | Bradley et al. | |
| 8,161,919 B2 | 4/2012 | Klotz et al. | |
| 8,251,039 B2 | 8/2012 | Speer | |
| 8,583,330 B2 | 11/2013 | Furness et al. | |
| 8,757,332 B2 | 6/2014 | Keahey et al. | |
| 9,026,345 B2 | 5/2015 | Dudar et al. | |
| 9,140,627 B2 | 9/2015 | Dudar et al. | |
| 2006/0060401 A1 | 3/2006 | Bole | |
| 2013/0297234 A1 | 11/2013 | Criel et al. | |
| 2014/0238369 A1 | 8/2014 | Jankovic et al. | |
| 2015/0032357 A1 * | 1/2015 | Dudar | F02D 41/021 |
| | | | 701/103 |
| 2015/0046026 A1 | 2/2015 | Pearce et al. | |
| 2015/0287011 A1 | 10/2015 | Harter | |
| 2017/0186247 A1 * | 6/2017 | Thorley | G07C 5/006 |

OTHER PUBLICATIONS

Dudar, Aed M., "Evaporative Emissions Testing Using Inductive Heating," U.S. Appl. No. 14/866,305, filed Sep. 25, 2015, 59 pages.

* cited by examiner

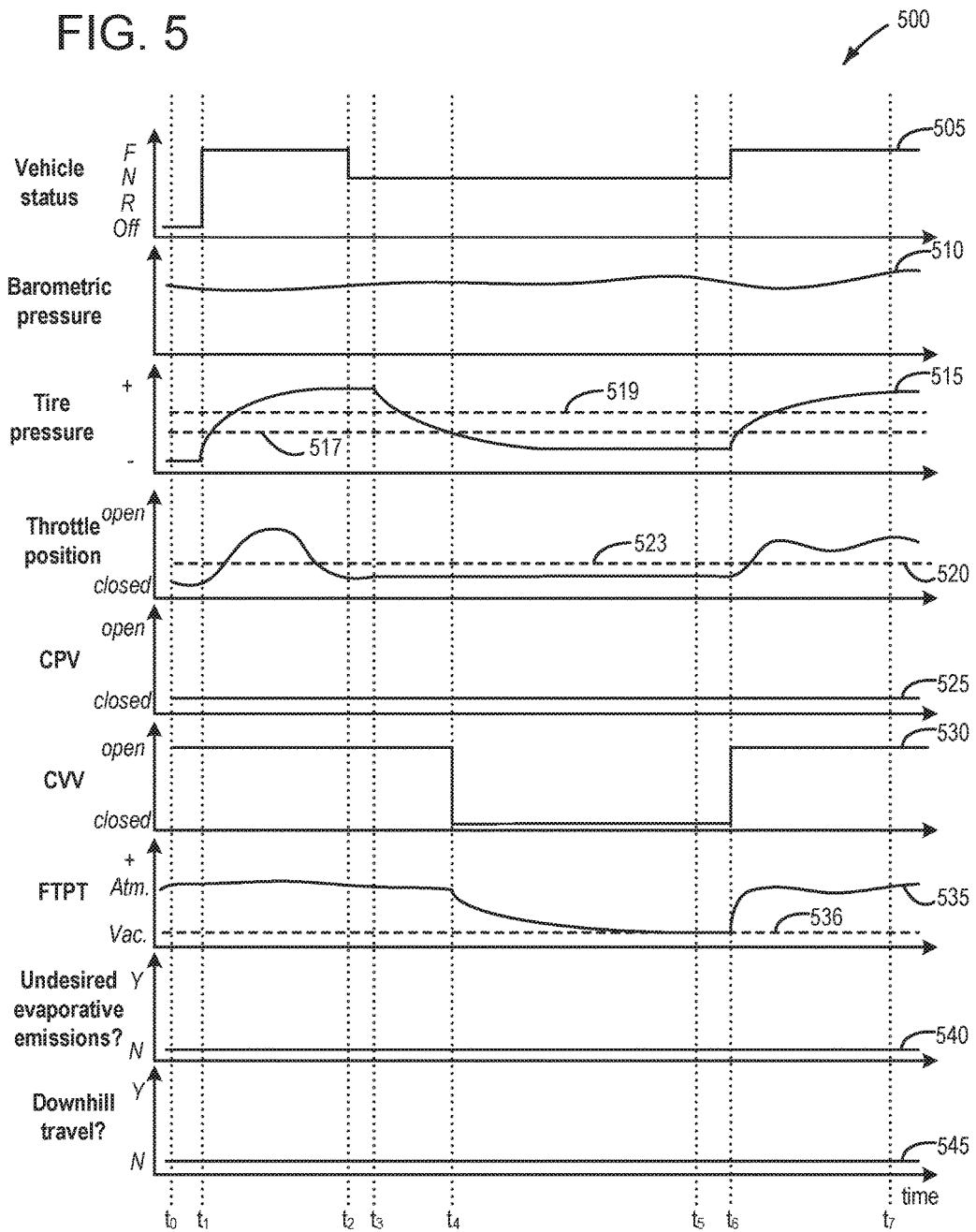

SYSTEMS AND METHODS FOR OPPORTUNISTIC VEHICLE EVAPORATIVE EMISSIONS TEST DIAGNOSTIC

FIELD

The present description relates generally to methods and systems for controlling a vehicle to opportunistically conduct an evaporative emissions test diagnostic procedure during conditions where significant cooling of a vehicle fuel tank is likely to occur.

BACKGROUND/SUMMARY

Vehicle evaporative emissions control systems may be configured to store fuel vapors from fuel tank refueling and diurnal engine operations, and then purge the stored vapors during a subsequent engine operation. In an effort to meet stringent federal emissions regulations, emission control systems may need to be intermittently diagnosed for the presence of undesired evaporative emissions that could release fuel vapors to the atmosphere.

Undesired evaporative emissions may be identified using engine-off natural vacuum (EONV) during conditions when a vehicle engine is not operating. In particular, a fuel system may be isolated at an engine-off event. The pressure in such a fuel system will increase if the tank is heated further (e.g., from hot exhaust or a hot parking surface) as liquid fuel vaporizes. As a fuel tank cools down, a vacuum is generated therein as fuel vapors condense to liquid fuel. Vacuum generation is monitored and undesired evaporative emissions identified based on expected vacuum development or expected rates of vacuum development. The EONV evaporative emissions test may be monitored for a period of time based on an available battery charge.

However, the EONV test is prone to false failures based on customer driving and parking habits. For example, a refueling event that fills the fuel tank with relatively cool liquid fuel followed by a short ensuing trip may fail to heat the fuel bulk mass and result in a false fail if an EONV test is run. Further, the rates of vacuum development are based in part on the ambient temperature. During mild weather conditions, the ambient temperature may restrict the amount of heating or cooling of the fuel tank following engine shut-off, and thus limit the rate of pressure or vacuum development. As such, vacuum may not reach expected threshold levels in the time allotted for the EONV test based on available battery charge. This may result in a false-fail condition, leading to potentially unnecessary engine service.

U.S. Pat. No. 9,140,627 teaches a method for a vehicle fuel system comprising indicating whether an ambient temperature is within a threshold range, and if so, operating a cooling fan to increase a fuel tank vacuum, and indicating undesired evaporative emissions in the vehicle fuel system based on the increased vacuum. However, the inventors herein have recognized potential issues with such a method. For example, U.S. Pat. No. 9,140,627 teaches conducting the evaporative emissions test procedure during engine off conditions, where operating a cooling fan may negatively impact vehicle battery charge capacity, and may thus in turn negatively impact fuel consumption.

Thus, the inventors herein have recognized the above issues, and have developed systems and methods to at least partially address the above issues. In one example, a method is provided comprising responsive to an indication that a vehicle is in the process of a car wash event; sealing a fuel system and an evaporative emissions system of the vehicle; and conducting a diagnostic test for the presence of undesired evaporative emissions.

As one example, the fuel system includes a fuel tank that supplies fuel to an engine of the vehicle, and the evaporative emissions system includes a fuel vapor canister configured to capture and store fuel vapors from the fuel tank, and wherein sealing the fuel system and evaporative emissions system comprises sealing the fuel system and evaporative emission system from atmosphere and from the engine, and wherein a fuel tank temperature decrease during the car wash event results in a vacuum build in the fuel system and evaporative emissions system. In this way, during a car wash event where the vehicle fuel tank is likely to be rapidly cooled as a result of cold water striking the fuel tank, the fuel system and evaporative emissions system may be sealed and the presence or absence of undesired evaporative emissions indicated based on a vacuum build in the fuel system and evaporative emissions system. By conducting an evaporative emissions test diagnostic based on conditions where a vacuum build in the fuel system and evaporative emissions system is likely to be robust, test completion rates may be improved, and undesired evaporative emissions may be reduced.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows an example timeline for conducting an evaporative emissions test diagnostic procedure based on tire pressure, barometric pressure, and transmission gear state.

DETAILED DESCRIPTION

Figure 2:
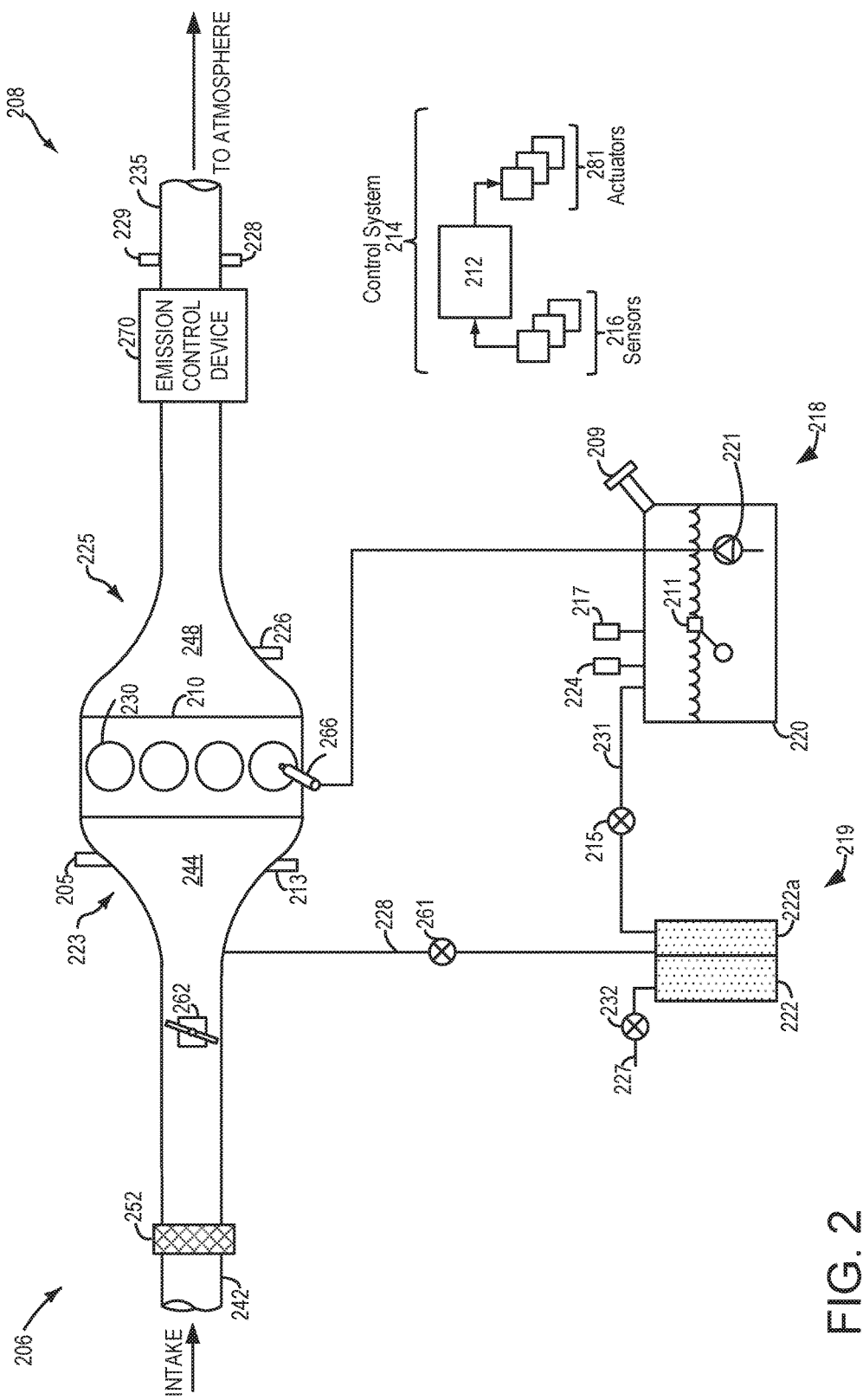
FIG. 2 shows a schematic diagram of a vehicle engine system including an evaporative emission control system.
Figure 3:
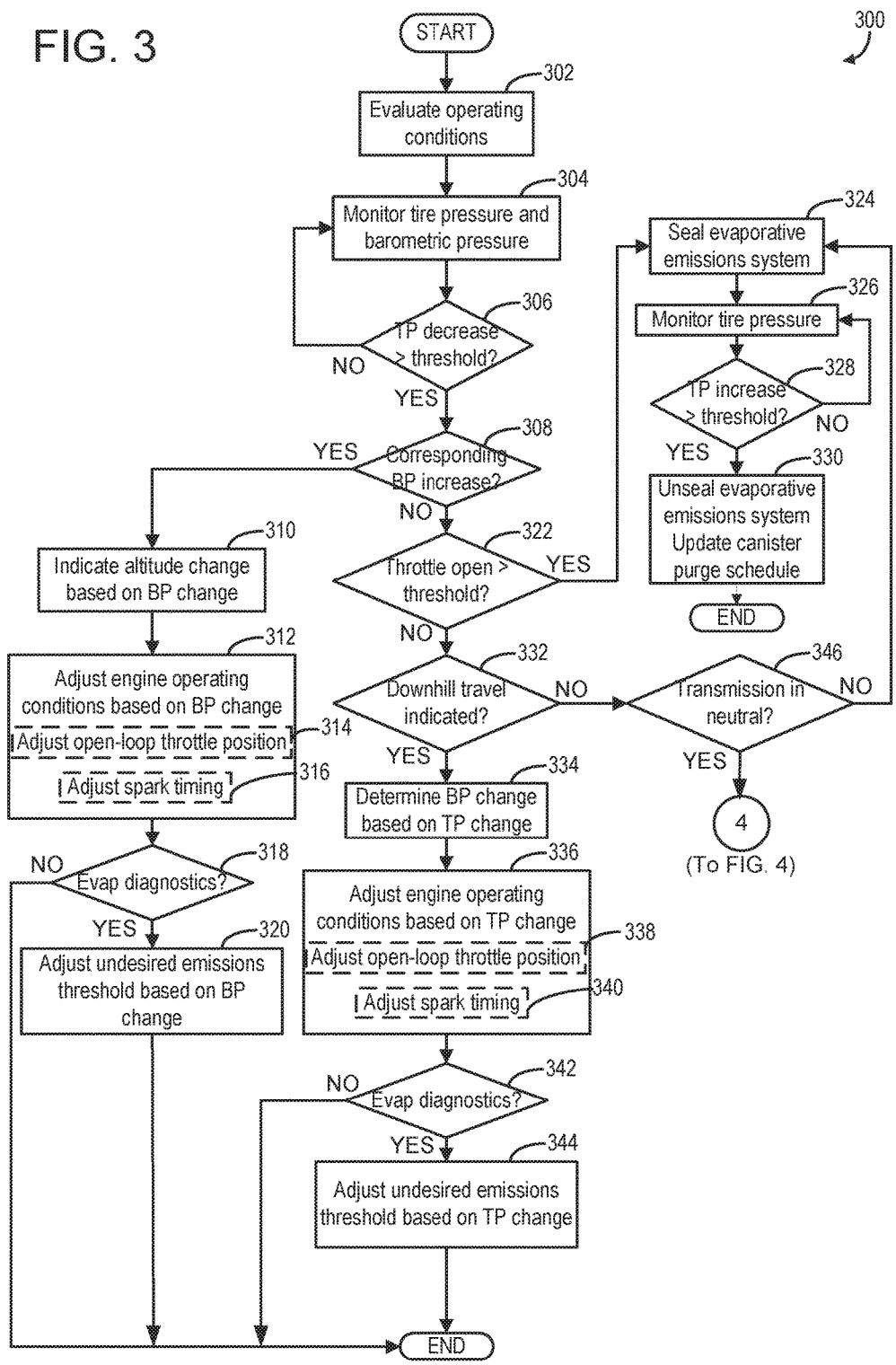
FIG. 3 shows an example method for controlling vehicle engine operating conditions and a vehicle evaporative emissions system based on at least indicated tire pressure and barometric pressure.

This detailed description relates to systems and methods for controlling engine operation and for controlling operation of evaporative emissions test diagnostic procedures. Specifically, the description relates to indicating a tire pressure (TP) drop below a predetermined tire pressure threshold, without a concurrent increase in barometric pressure (BP) and concurrent with an indication that the vehicle is not traveling downhill and that the vehicle transmission is in neutral. As such, it may be indicated that the vehicle is in the process of a carwash event, where the fuel tank may be significantly cooled responsive to cold water striking/splashing the fuel tank and underbody of the vehicle. If the vehicle evaporative emissions system is sealed under such conditions, the rapid cooling of the fuel tank may result in the development of vacuum in the fuel system and evaporative emissions system that may be used to indicate the presence or absence of undesired evaporative emissions. The system and methods may be applied to a vehicle system capable of indicating tire pressure via tire pressure monitoring sensors (TPMS), such as the hybrid vehicle system depicted in FIG. 1. While a hybrid vehicle is presented, it should be understood that the hybrid vehicle system represents an example vehicle system, and that the system and methods described herein may be applied to any vehicle system capable of indicating tire pressure via TPMS. Furthermore, the system and methods may be applied to any vehicle comprising an evaporative emissions control system that is capable of storing fuel vapors and subsequently purging stored fuel vapors to engine intake. For example, the system and methods may be applied to a vehicle with a fuel system coupled to an evaporative emissions control system, as depicted in FIG. 2. A method for controlling engine operation and evaporative emissions system operation is illustrated in FIG. 3. For example, if a tire pressure decrease is correlated with a barometric pressure increase, an altitude change may be indicated based on the barometric pressure change, and engine operation as well as evaporative emissions test thresholds adjusted accordingly. In another example, if a tire pressure decrease is not correlated with a barometric pressure increase, although it is indicated that the vehicle is traveling downhill, engine operation and evaporative emissions test thresholds may be adjusted based on the tire pressure change. In still another example, if a tire pressure change is not correlated with a barometric pressure change, the evaporative emissions system may be sealed to prevent the induction of water into a fuel vapor canister in the evaporative emissions system. Finally, in yet another example, if a change in tire pressure is not correlated with a barometric pressure change, downhill travel of the vehicle is not indicated, and the vehicle transmission is in neutral, an evaporative emissions test diagnostic procedure may be conducted according to the method depicted in FIG. 4. An example timeline for controlling an evaporative emissions test diagnostic procedure responsive to a tire pressure change in the absence of a barometric pressure change, where downhill travel is not indicated and the vehicle transmission is in neutral, is depicted in FIG. 5.

Figure 1:
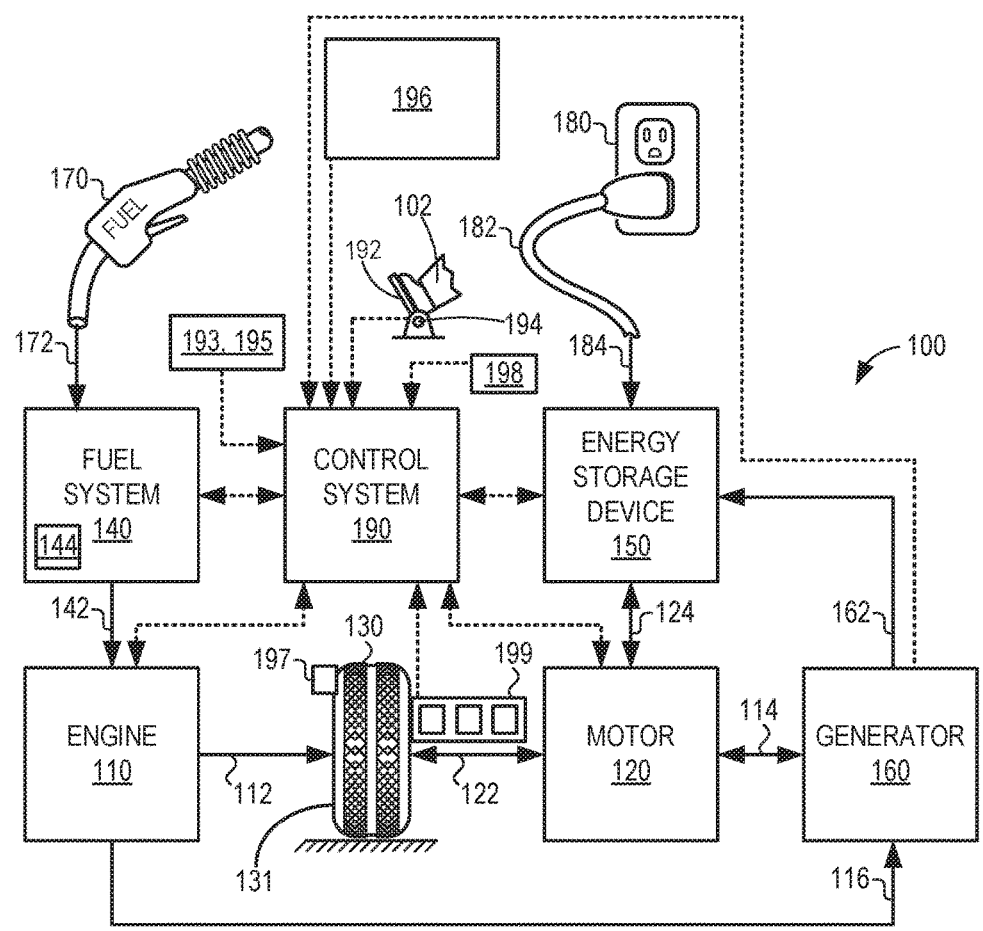
FIG. 1 shows a schematic diagram of an example vehicle propulsion system.

Turning now to the figures, FIG. 1 illustrates an example vehicle propulsion system 100. For example, vehicle system 100 may be a hybrid electric vehicle or a plug-in hybrid electric vehicle. However, it should be understood that, though FIG. 1 shows a hybrid vehicle system, in other examples, vehicle system 100 may not be a hybrid vehicle system and may be propelled solely via engine 110.

Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV). While FIG. 1 depicts a HEV, the description is not meant to be limiting and it may be understood that they systems and methods depicted herein may be applied to non-HEVs without departing from the scope of the present disclosure.

In some examples, vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, generator 160, an onboard global positioning system (GPS) 193, and onboard cameras 195. Further, control system 190 may send control signals to one or more of engine 110, motor 120, fuel system 140, energy storage device 150, generator 160, and onboard cameras 195, responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

One or more tire pressure monitoring sensors (TPMS) may be coupled to one or more tires of wheels in the vehicle. For example, FIG. 1 shows a tire pressure sensor 197 coupled to wheel 130 and configured to monitor a pressure in a tire 131 of wheel 130. As described in more detail below, tire pressure sensors can be used as an auxiliary source for determining whether the vehicle tires are exposed to water, such as during heavy rain or during a carwash event. For example, a tire pressure decrease may indicate that the vehicle is driving through water, or in a carwash, the tire pressure decrease resulting from a cooling of the tire(s). In some examples, as described in more detail below, a tire pressure decrease in the absence of a barometric pressure change may indicate that the vehicle tires are exposed to water, rather than a condition where the vehicle is traveling downhill. In still other examples, under some conditions changes in tire pressure may be used to indicate a change in barometric pressure. For example, a tire pressure decrease may indicate a decrease in vehicle altitude.

FIG. 2 shows a schematic depiction of a hybrid vehicle system 206 that can derive propulsion power from engine system 208 and/or an on-board energy storage device, such as a battery system (see FIG. 1 for a schematic depiction). An energy conversion device, such as a generator (not shown), may be operated to absorb energy from vehicle motion and/or engine operation, and then convert the absorbed energy to an energy form suitable for storage by the energy storage device.

Engine system 208 may include an engine 210 having a plurality of cylinders 230. Engine 210 includes an engine intake 223 and an engine exhaust 225. Engine intake 223 includes an air intake throttle 262 fluidly coupled to the engine intake manifold 244 via an intake passage 242. Air may enter intake passage 242 via air filter 252. Engine exhaust 225 includes an exhaust manifold 248 leading to an exhaust passage 235 that routes exhaust gas to the atmosphere. Engine exhaust 225 may include one or more emission control devices 270 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 208 is a boosted engine system, the engine system may further include a boosting device, such as a turbocharger (not shown).

Engine system 208 is coupled to a fuel system 218, and evaporative emissions system 219. Fuel system 218 includes a fuel tank 220 coupled to a fuel pump 221, the fuel tank supplying fuel to an engine 210 which propels a vehicle. Evaporative emissions system 219 includes fuel vapor canister 222. During a fuel tank refueling event, fuel may be pumped into the vehicle from an external source through refueling port 209. Fuel tank 220 may hold a plurality of fuel blends, including fuel with a range of alcohol concentrations, such as various gasoline-ethanol blends, including E10, E85, gasoline, etc., and combinations thereof. A fuel level sensor 211 located in fuel tank 220 may provide an indication of the fuel level ("Fuel Level Input") to controller 212. As depicted, fuel level sensor 211 may comprise a float connected to a variable resistor. Alternatively, other types of fuel level sensors may be used.

Fuel pump 221 is configured to pressurize fuel delivered to the injectors of engine 210, such as example injector 266. While only a single injector 266 is shown, additional injectors are provided for each cylinder. It will be appreciated that fuel system 218 may be a return-less fuel system, a return fuel system, or various other types of fuel system. Vapors generated in fuel tank 220 may be routed to fuel vapor canister 222, via conduit 231, before being purged to the engine intake 223.

Fuel vapor canister 222 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 222 may be purged to engine intake 223 by opening canister purge valve 261. While a single canister 222 is shown, it will be appreciated that fuel system 218 may include any number of canisters. In one example, canister purge valve 261 may be a solenoid valve wherein opening or closing of the valve is performed via actuation of a canister purge solenoid.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 222 includes a vent line 227 for routing gases out of the canister 222 to the atmosphere when storing, or trapping, fuel vapors from fuel tank 220. Vent line 227 may also allow fresh air to be drawn into fuel vapor canister 222 when purging stored fuel vapors to engine intake 223 via purge line 228 and purge valve 261. While this example shows vent line 227 communicating with fresh, unheated air, various modifications may also be used. Vent line 227 may include a canister vent valve 232 to adjust a flow of air and vapors between canister 222 and the atmosphere. The canister vent valve 232 may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 232 may be a solenoid valve wherein opening or closing of the valve is performed via actuation of a canister vent solenoid. In particular, the canister vent valve may be in an open position that is closed upon actuation of the canister vent solenoid.

Hybrid vehicle system 206 may have reduced engine operation times due to the vehicle being powered by engine system 208 during some conditions, and by the energy storage device under other conditions. While the reduced engine operation times reduce overall carbon emissions from the vehicle, they may also lead to insufficient purging of fuel vapors from the vehicle's emission control system. To address this, in one example a fuel tank isolation valve 215 may be optionally included in conduit 231 such that fuel tank 220 is coupled to canister 222 via the valve. During regular engine operation, isolation valve 215 may be kept closed to limit the amount of diurnal or "running loss" vapors directed to canister 222 from fuel tank 220. During refueling operations, isolation valve 215 may be temporarily opened, e.g., for a duration, to direct fuel vapors from the fuel tank 220 to canister 222. By opening the valve during refueling operations when the fuel tank pressure is higher than a threshold (e.g., above a mechanical pressure limit of the fuel tank), the refueling vapors may be released into the canister and the fuel tank pressure may be maintained below pressure limits. While the depicted example shows isolation valve 215 positioned along conduit 231, in alternate embodiments, the isolation valve may be mounted on fuel tank 220. Furthermore, as will be discussed in more detail below, in other examples a fuel tank isolation valve may not be included in the vehicle.

One or more pressure sensors 217 may be coupled to fuel system 218 for providing an estimate of a fuel system (and evaporative emissions system) pressure. In one example, the fuel system pressure, and in some example evaporative emissions system pressure as well, is indicated by pressure sensor 217, where pressure sensor 217 is a fuel tank pressure transducer (FTPT) coupled to fuel tank 220. While the depicted example shows pressure sensor 217 directly coupled to fuel tank 220, in alternate embodiments, the pressure sensor may be coupled between the fuel tank and canister 222, for example between the fuel tank and isolation valve 215 (if included). In still other embodiments comprising a fuel tank isolation valve, a first pressure sensor may be positioned upstream of the isolation valve (between the isolation valve and the canister), while a second pressure sensor may be positioned downstream of the isolation valve (between the isolation valve and the fuel tank), to provide an estimate of a pressure difference across the valve. In some examples, a vehicle control system may infer and indicate undesired evaporative emissions based on changes in a fuel tank (and evaporative emissions system) pressure during an evaporative emissions diagnostic routine, as described in further detail below.

One or more temperature sensors 224 may also be coupled to fuel system 218 for providing an estimate of a fuel system temperature. In one example, the fuel system temperature is a fuel tank temperature, wherein temperature sensor 224 is a fuel tank temperature sensor coupled to fuel tank 220 for estimating a fuel tank temperature. While the depicted example shows temperature sensor 224 directly coupled to fuel tank 220, in alternate embodiments, the temperature sensor may be coupled between the fuel tank and canister 222, for example.

Fuel vapors released from canister 222, for example during a purging operation, may be directed into engine intake manifold 244 via purge line 228. The flow of vapors along purge line 228 may be regulated by canister purge valve 261, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 212, responsive to engine operating conditions, including, for example, engine speed-load conditions, an air-fuel ratio, a canister load, etc. By commanding the canister purge valve to be closed, the controller may seal the fuel vapor recovery system (evaporative emissions control system) from the engine intake. An optional canister check valve (not shown) may be included in purge line 228 to prevent intake manifold pressure from flowing gases in the opposite direction of the purge flow. As such, the check valve may be necessary if the canister purge valve control is not accurately timed or the canister purge valve itself can be forced open by a high intake manifold pressure.

The engine intake may include various sensors. For example, a mass air flow (MAF) sensor 205 may be coupled to the engine intake to determine a rate of air mass flowing through the intake. Further, a barometric pressure sensor 213 may be included in the engine intake. For example, barometric pressure sensor 213 may be a manifold air pressure (MAP) sensor and may be coupled to the engine intake downstream of throttle 262. During some conditions, barometric pressure sensor 213 may be used to determine BP changes, e.g., due to altitude changes of the vehicle. However, barometric pressure sensor 213 may rely on part throttle or full or wide open throttle conditions, e.g., when an opening amount of throttle 262 is greater than a threshold, in order accurately determine BP. Thus, during closed throttle conditions, e.g., when an opening amount of throttle 262 is less than the threshold, the sensor may not be able to be used to infer BP. During such conditions, one or more tire pressure sensors may be used to determine BP changes as described in more detail below.

Fuel system 218 and evaporative emissions system 219 may be operated by controller 212 in a plurality of modes by selective adjustment of the various valves and solenoids. For example, the fuel system and evaporative emissions system may be operated in a fuel vapor storage mode (e.g., during a fuel tank refueling operation and with the engine not running), wherein the controller 212 may open isolation valve 215 (if included) and canister vent valve 232 while closing canister purge valve (CPV) 261 to direct refueling vapors into canister 222 while preventing fuel vapors from being directed into the intake manifold.

As another example, the fuel system and evaporative emissions system may be operated in a refueling mode (e.g., when fuel tank refueling is requested by a vehicle operator), wherein the controller 212 may open isolation valve 215 (if included) and canister vent valve 232, while maintaining canister purge valve 261 closed, to depressurize the fuel tank before enabling fuel to be added therein. As such, isolation valve 215 (if included) may be kept open during the refueling operation to allow refueling vapors to be stored in the canister. After refueling is completed, the isolation valve (if included) may be closed.

As yet another example, the fuel system and evaporative emissions system may be operated in a canister purging mode (e.g., after an emission control device light-off temperature has been attained and with the engine running), wherein the controller 212 may open canister purge valve 261 and canister vent valve 232 while closing isolation valve 215 (if included). Herein, the vacuum generated by the intake manifold of the operating engine may be used to draw fresh air through vent line 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 222 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Vehicle system 206 may further include control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 226 located upstream of the emission control device, temperature sensor 228, temperature sensor 224, MAP sensor 213, fuel tank pressure sensor 217, and pressure sensor 229. Other sensors such as additional pressure, temperature, air/fuel ratio, and composition sensors may be coupled to various locations in the vehicle system 206. As another example, the actuators may include fuel injector 266, isolation valve 215 (if included), canister purge valve 261, canister vent valve 232, fuel pump 221, and throttle 262.

Control system 214 may further receive information regarding the location of the vehicle from an on-board global positioning system (GPS). Information received from the GPS may include vehicle speed, vehicle altitude, vehicle position/location, etc. This information may be used to infer engine operating parameters, such as local barometric pressure. Control system 214 may further be configured to receive information via the internet or other communication networks. Information received from the GPS may be cross-referenced to information available via the internet to determine local weather conditions, local vehicle regulations, etc. Control system 214 may use the internet to obtain updated software modules which may be stored in non-transitory memory.

The control system 214 may include a controller 212. Controller 212 may be configured as a conventional microcomputer including a microprocessor unit, input/output ports, read-only memory, random access memory, keep alive memory, a controller area network (CAN) bus, etc. Controller 212 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. An example control routine is described herein with regard to FIG. 3 and FIG. 4.

Controller 212 may also be configured to intermittently perform evaporative emissions detection routines on fuel system 218 and evaporative emissions system 219 to confirm that the fuel system and/or evaporative emissions system is not degraded. As such, various diagnostic evaporative emissions detection tests may be performed while the engine is off (engine-off evaporative emissions test) or while the engine is running (engine-on evaporative emissions test). Evaporative emissions tests performed while the engine is running may include applying a negative pressure on the fuel system and evaporative emissions system for a duration (e.g., until a target vacuum is reached) and then sealing the fuel system and evaporative emissions system while monitoring a change in pressure (e.g., a rate of change in the vacuum level, or a final pressure value). Evaporative emissions tests performed while the engine is not running may include sealing the fuel system and evaporative emissions system following engine shut-off and monitoring a change in pressure. This type of evaporative emissions test is referred to herein as an engine-off natural vacuum test (EONV). In sealing the fuel system and evaporative emissions system following engine shut-off, pressure in such a fuel system and evaporative emissions control system will increase if the tank is heated further (e.g., from hot exhaust or a hot parking surface) as liquid fuel vaporizes. If the pressure rise meets or exceeds a predetermined threshold, it may be indicated that the fuel system and the evaporative emissions control system are free from undesired evaporative emissions. Alternatively, if during the pressure rise portion of the test the pressure curve reaches a zero-slope prior to reaching the threshold, as fuel in the fuel tank cools, a vacuum is generated in the fuel system and evaporative emissions system as fuel vapors condense to liquid fuel. Vacuum generation may monitored and undesired emissions identified based on expected vacuum development or expected rates of vacuum development. The EONV test may be monitored for a period of time based on available battery charge. In still other examples, as will be described in further detail below, responsive to conditions where it is likely that significant cooling of the fuel tank may occur, such as during a car wash event, the fuel system and evaporative emissions system may be sealed and a vacuum build monitored. A vacuum build reaching a predetermined vacuum threshold, or a rate of vacuum development equal to or greater than an expected rate of vacuum development may indicate an absence of undesired evaporative emissions.

Turning now to FIG. 3, a flow chart for a high level example method 300 for controlling engine operation and evaporative emissions system operation is shown. More specifically, method 300 may be used to indicate a decrease in tire pressure (TP), and if a corresponding increase in barometric pressure (BP) is indicated, engine operation and evaporative emissions test thresholds may be adjusted based on the BP change. If a decrease in TP is indicated without a corresponding increase in BP, in one example the evaporative emissions system may be sealed without conducting an evaporative emissions test diagnostic, in another condition engine operating conditions and evaporative emissions system test thresholds may be adjusted based on the TP change, and in yet another condition, an evaporative emissions test may be conducted according to the method depicted in FIG. 4. Method 300 will be described with reference to the systems described herein and shown in FIGS. 1-2, though it should be understood that similar methods may be applied to other systems without departing from the scope of this disclosure. Method 300 may be carried out by a controller, such as controller 212 in FIG. 2, and may be stored at the controller as executable instructions in non-transitory memory. Instructions for carrying out method 300 and the rest of the methods included herein may be executed by the controller based on instructions stored on a memory of the controller and in conjunction with signals received from sensors of the vehicle system, such as the tire pressure sensors (e.g., 197), the barometric pressure sensor (e.g., 205), and roll stability sensor(s) (e.g., 199) described above with reference to FIG. 1 and FIG. 2, respectively. The controller may employ evaporative emissions system actuators such as the canister purge valve (e.g., 261) and the canister vent valve (e.g., 232) to control evaporative emissions system operation, according to the methods described below. Furthermore, other engine, fuel system, and evaporative emissions system actuators may additionally be employed according to the methods described below. Finally, as indicated above, in some examples a fuel tank isolation valve may be included. In this example method, it may be understood that a fuel tank isolation valve is not included, yet a fuel tank isolation valve may be included without departing from the scope of the present disclosure.

Method 300 begins at 302 and may include evaluating operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 304, method 300 may include monitoring tire pressure (TP) and barometric pressure (BP). For example, at 304, one or more tire pressure sensors coupled to one or more tires of the vehicle may be used to monitor TP. Tire pressure sensors may be used in the vehicle to provide an indication to a vehicle operator of TP in the tires so that the vehicle operator may be alerted if pressure in the tires becomes too low so that air may be added to the tires. For example, if the TP in a tire becomes too low then an indication may be sent to a display in the vehicle to alert the driver. These tire pressure sensors may additionally be used to determine barometric pressure (BP) changes, e.g. due to altitude changes of the vehicle, as will be described in further detail below. Briefly, tire pressure may increase responsive to increasing altitude, and tire pressure may decrease responsive to decreasing altitude, thus providing an indication of BP. Furthermore, these tire pressure sensors may be used to indicate when the vehicle is traveling in or exposed to a heavy water condition, based on an indicated pressure drop as a result of tire cooling. Additionally, BP may be monitored via a BP sensor in the intake of the engine. For example, a BP sensor may be used to determine BP during engine operating conditions when the engine intake throttle position is greater than a threshold, where the threshold is a throttle opening amount which is large enough to enable a sufficient amount of intake air to reach the BP sensor for BP determination.

Proceeding to 306, method 300 may include indicating whether a TP decrease greater than a threshold is indicated. The threshold may be a predetermined threshold and may be based on an expected pressure decrease responsive to a predetermined temperature decrease. For example, the threshold may be based on the expected TP decrease corresponding to a small change in temperature (e.g., <5° F.), a large change in temperature (e.g., >10° F.), or any range of temperatures in between. At 306, if a TP decrease greater than the predetermined threshold is not indicated, method 300 may include continuing to monitor TP and BP at 304. Alternatively, if at 306 method 300 indicates a TP decrease greater than the predetermined threshold, method 300 may proceed to 308. At 308, method 300 may include indicating whether a corresponding increase in BP is indicated. At 308, an increase in BP may be indicated by the BP sensor. In one example, whether a corresponding increase in BP is indicated may include predicting a BP change based on the indicated TP change at 308, and if the observed BP change at 308 is similar to the BP change expected, then a corresponding increase in BP may be indicated.

Continuing at 310, a decrease in TP and a corresponding increase in BP may be assumed to indicate a change in altitude. Accordingly, at 310, method 300 may include indicating an altitude change based on the BP change. In this example, a decrease in altitude may be indicated based on the increase in BP. In some examples, indicating an altitude change may include updating a display device in the vehicle to notify a vehicle operator of the altitude change. Further, indicating an altitude change may include updating an altitude and/or BP parameter in an engine controller so that various engine operating parameters may be adjusted accordingly.

Proceeding to 312, method 300 may include adjusting engine operating conditions based on the BP change. For example, method 300 may include adjusting an open loop commanded throttle position to compensate for the BP change at 314 and/or adjusting a spark timing at 316. For example, as BP increases as a result of an altitude decrease, open loop commanded throttle position may be adjusted (e.g., toward a more closed position) to compensate for the BP change. In another example, a more aggressive spark timing may be employed in response to a decrease in altitude (increase in BP), to compensate for the BP change. Furthermore, in some examples adjusting engine operating conditions based on the BP change may include updating an exhaust gas recirculation (EGR) schedule, provided that the vehicle is configured with one or more cylinders that may route exhaust gas back to the intake manifold to provide a desired dilution. For example, responsive to an increase in BP, an amount of exhaust gas recirculated to the intake may be increased in order to provide the desired dilution.

Proceeding to 318, method 300 includes determining if evaporative emissions test diagnostics are being performed. For example, evaporative emissions test diagnostics may include applying vacuum to the evaporative emission control system and monitoring corresponding pressure changes. In one example, applying vacuum may include applying intake manifold vacuum to the evaporative emission control system. If vacuum in the emission control system increases to a threshold vacuum level, then an absence of undesired evaporative emissions may be indicated. However, if the vacuum does not increase to the vacuum threshold, then undesired evaporative emissions may be indicated. The vacuum threshold for indicating the presence or absence of undesired evaporative emissions may depend on BP. As such, if evaporative emissions test diagnostics are being performed at 318, method 300 may proceed to 320. At 320, method 300 may include adjusting a threshold for indicating undesired evaporative emissions based on the BP change determined via the BP sensor. For example, responsive to an increase in BP (decrease in altitude), the threshold for indicating the absence of undesired evaporative emissions may be increased to compensate for the increase in BP. In some examples (not shown), if an altitude of the vehicle changes so rapidly that the rate of BP change is greater than a threshold, then evaporative emissions test diagnostics may be unreliable, and thus, the evaporative emissions test may be aborted.

Returning to 308, in some examples a TP decrease may be indicated, while a BP change is not indicated (absence of BP change). As such, as discussed above, at 322 method 300 may include indicating whether throttle opening is greater than a threshold. For example, if throttle opening is not greater than a threshold, then an accurate BP measurement may not be obtained, as accurate BP measurements rely on a sufficient amount of intake air reaching the BP sensor for BP determination. Such a closed throttle condition may be indicative of a vehicle traveling down a hill wherein engine load is low. Other examples of closed throttle conditions may include conditions wherein a vehicle is not traveling downhill, but wherein engine speed or load is less than a threshold. Such an example may include driving at a low speed through deep water, or sudden release of the gas pedal upon encountering water while driving. If, at 322 it is indicated that throttle opening is greater than the threshold such that an accurate BP measurement can be attained, and as such a TP decrease is indicated without a corresponding decrease in BP, the TP decrease may be due to the vehicle being exposed to water, for example heavy rain.

Proceeding to 324, method 300 may include sealing the evaporative emissions control system. As a TP decrease greater than a predetermined threshold was indicated at 306, and a corresponding BP increase (absence of BP change) was not observed although throttle opening was greater than the threshold was indicated, the indicated TP decrease likely resulted from significant cooling of the vehicle tires due to tire exposure to water during vehicle operation. One example may include a vehicle driving through water, as in the case of a flood or heavy rain. Other examples may include a vehicle traversing a stretch of water, such as a small river or stream. As such, if the evaporative emissions control system is not sealed, and if canister purging is not suspended, then water may be ingested into the fuel vapor canister, thus corrupting the activated carbon inside the canister. Accordingly, at 324, method 300 may include closing or maintaining closed the canister purge valve (CPV), closing or maintaining closed the canister vent valve (CVV), and discontinuing any scheduled fuel vapor canister purging operations. In such an example condition, where it is likely that the vehicle tires are exposed to water during vehicle operation where throttle opening is greater than the threshold, conducting an evaporative emissions test diagnostic may not be desirable as the fuel tank may or may not be significantly cooled under such circumstances. As such, by sealing the evaporative emission system and suspending canister purging, function lifetime of the fuel vapor canister may be prolonged.

Proceeding to 326, method 300 includes monitoring TP while the evaporative emissions control system is sealed from atmosphere. As described above, monitoring TP may include monitoring one or more TP sensors coupled to one or more tires of the vehicle to indicate TP. Proceeding to 328, method 300 may include indicating whether a TP increase greater than a predetermined threshold is indicated. For example, the predetermined threshold may be a threshold related to an expected tire pressure increase based on a threshold tire temperature increase. In one example, the threshold tire temperature increase may be based on an expected increase in tire temperature responsive to resuming driving wherein the tires are no longer exposed to a significant amount of water. If at 328 a TP increase greater than the predetermined threshold is not indicated, method 300 may include continuing to monitor tire pressure at 326. Alternatively, at 328 if a TP increase greater than the predetermined threshold is indicated, method 300 may proceed to 330.

At 330, method 300 may include unsealing the evaporative emissions control system. For example, unsealing the evaporative emissions control system at 330 may include commanding open the canister vent valve. Furthermore, at 330, method 300 may include updating engine operating parameters to include information that the evaporative emissions control system was sealed for a duration, and that canister purge operations were suspended during the duration the evaporative emissions control system was sealed. For example, a canister purge operation may be scheduled for the next opportunity responsive to canister purge conditions being met. Method 300 may then end.

Returning to 322, if it is indicated that throttle opening is not greater than a threshold, method 300 may proceed to 332 and may include indicating whether the vehicle is likely to be traveling downhill. In other words, at 332, method 300 may include indicating whether the TP decrease is likely due to the vehicle traveling downhill, as opposed to a TP decrease resulting from a sudden cooling of the tires due to encountering water while driving. As such, at 332, method 300 may include obtaining information on vehicle pitch angle, for example via lateral sensors in the vehicle (e.g., 199). Based on the angle of the vehicle it may be determined that the vehicle is traveling down a hill. If equipped with a global positioning device (GPS), whether the vehicle is traveling downhill may be additionally or alternatively indicated via GPS. A further indication that the vehicle is traveling downhill may be based on vehicle speed compared to TP change. For example, a rapid TP decrease while the vehicle speed is below a threshold may not be consistent with a decrease in vehicle altitude. As such, if at 332 it is indicated that the vehicle is likely traveling downhill, method 300 may proceed to 334, and may include determining BP based on TP change. For example, the tire pressure change detected by the tire pressure sensors may be correlated with an associated change in BP. An amount of tire pressure change may be linearly correlated with a BP change. For example, if the tire pressure decreases by an amount then the BP may increase by the same amount. As such, an altitude change may be indicated based on the tire pressure change. In some examples, indicating an altitude change may include updating a display device in the vehicle to notify a vehicle operator of the altitude change. Further, indicating an altitude change may include updating an altitude and/or BP parameter in an engine controller so that various engine operating parameters may be adjusted accordingly, as described above.

Proceeding to 336, method 300 includes adjusting engine operating conditions based on the tire pressure change. As discussed above, various engine and vehicle operations may depend on an accurate measurement of BP for optimal operation. Thus, various engine and vehicle operations may be adjusted responsive to the change in BP corresponding to the change in TP. For example, method 300 may include adjusting an open loop commanded throttle position to compensate for the BP change at 338 and/or adjusting a spark timing at 340. For example, as BP increases as a result of an altitude decrease, open loop commanded throttle position may be adjusted (e.g., toward a more closed position) to compensate for the BP change. In another example, a more aggressive spark timing may be employed in response to a decrease in altitude (increase in BP), to compensate for the BP change. Furthermore, in some examples adjusting engine operating conditions based on the BP change may include updating an exhaust gas recirculation (EGR) schedule, provided that the vehicle is configured with one or more cylinders that may route exhaust gas back to the intake manifold to provide a desired dilution. For example, responsive to an increase in BP, an amount of exhaust gas recirculated to the intake may be increased in order to provide the desired dilution.

Proceeding to 342, method 300 includes determining if evaporative emissions test diagnostics are being performed. For example, as described above, evaporative emissions test diagnostics may include applying vacuum to the evaporative emission control system and monitoring corresponding pressure changes. The vacuum threshold for indicating the presence or absence of undesired evaporative emissions may depend on BP. As such, if evaporative emissions test diagnostics are being performed at 342, method 300 may proceed to 344. At 344, method 300 may include adjusting a threshold for indicating undesired evaporative emissions based on the BP change determined via the TP sensor. For example, responsive to an increase in BP (decrease in altitude), the threshold for indicating the absence of undesired evaporative emissions may be increased to compensate for the increase in BP. In some examples (not shown), if an altitude of the vehicle changes so rapidly that the rate of BP change is greater than a threshold, then evaporative emissions test diagnostics may be unreliable, and thus, the evaporative emissions test may be aborted.

Returning to 322, if downhill travel is not indicated, yet a TP decrease greater than the threshold tire pressure decrease was indicated without a corresponding BP change, method 300 may proceed to 346. At 346, method 300 may include indicating whether the vehicle transmission is in neutral. If the transmission is not indicated to be in neutral, it is likely the vehicle tires are exposed to water, during conditions where the vehicle is traveling at low speed. Such a condition may occur if the vehicle is traversing a large puddle, or small river or stream, as described above. Other conditions where the vehicle transmission may not be in neutral may be a case where the vehicle is backing up into water, such as may occur during a boat launch procedure. As such, if it is indicated that the vehicle transmission is not in neutral, if the evaporative emissions control system is not sealed, and if canister purging is not suspended, then water may be ingested into the fuel vapor canister, thus corrupting the activated carbon inside the canister, as discussed above.

Accordingly, if at 346 the vehicle transmission is not indicated to be in neutral, method 300 may proceed to 324. As described above, at 324 method 300 may include sealing the evaporative emissions control system by commanding closed or maintaining closed the CPV and commanding closed the CVV. Proceeding to 326, tire pressure may be monitored as described, and if a TP increase greater than a threshold is indicated at 328, the evaporative emissions system may be unsealed at 330, by commanding open the CVV. Alternatively, if a TP increase greater than the threshold is not indicated at 328, method 300 may continue to monitor TP at step 326 of method 300. At 330, as described above, responsive to the evaporative emissions control system being unsealed, engine operating parameters may be updated to include information that the evaporative emissions control system was sealed for a duration, and that canister purge operations were suspended during the duration the evaporative emissions control system was sealed. For example, a canister purge operation may be scheduled for the next opportunity responsive to canister purge conditions being met. Method 300 may then end.

Figure 4:
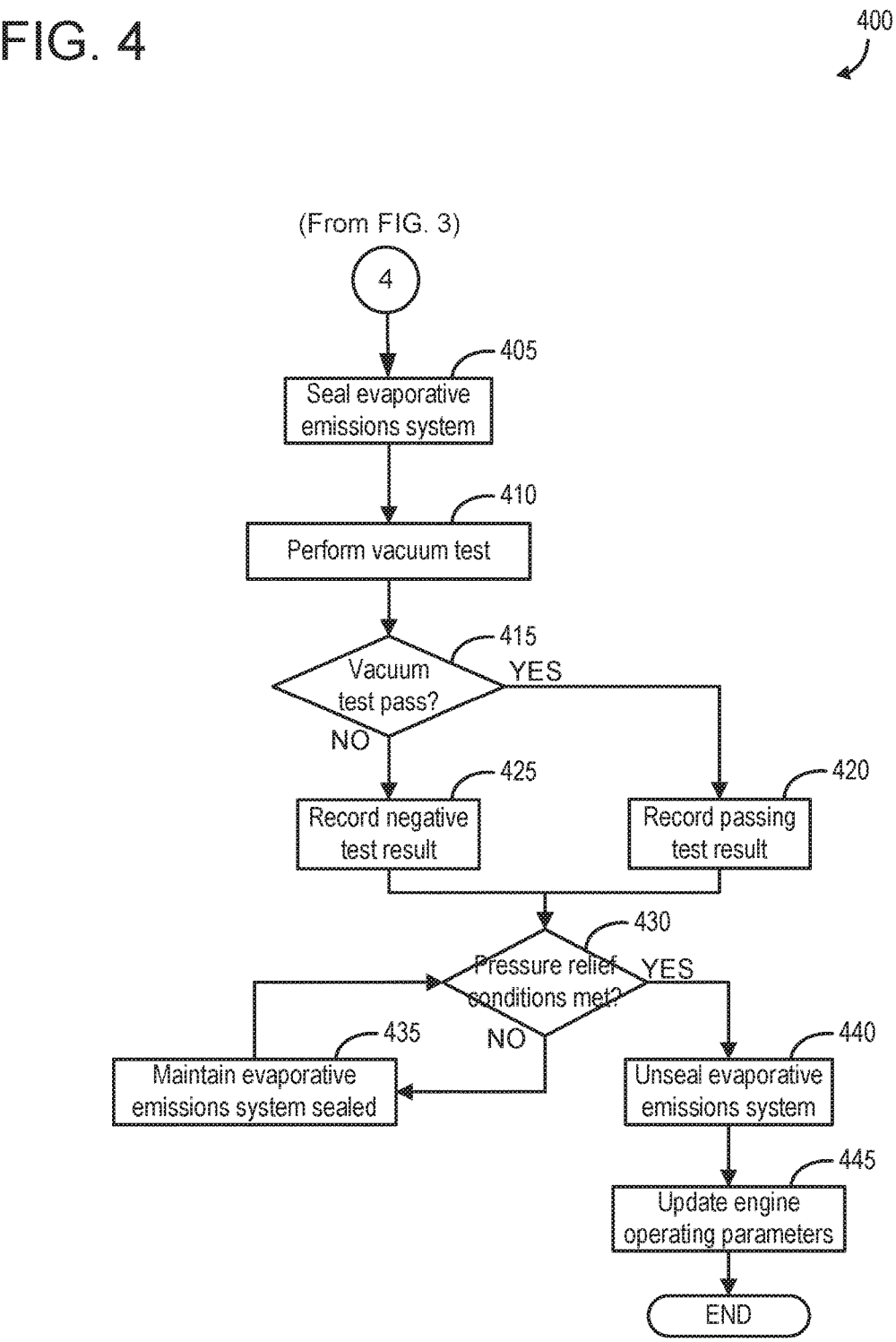
FIG. 4 shows an example method continuing from FIG. 3 for conducting an evaporative emissions test diagnostic procedure.

Returning to 346, if it is indicated that the vehicle transmission is in neutral, where a TP decrease greater than a threshold tire pressure decrease was indicated without a corresponding increase in BP, and in the absence of downhill travel, method 300 may proceed to FIG. 4, where method 400 may be used to conduct an opportunistic evaporative emissions system and fuel system test diagnostic procedure.

Turning now to FIG. 4, a flow chart for a high level example method 400 for conducting an opportunistic evaporative emissions system and fuel system test diagnostic procedure, is shown. More specifically, method 400 continues from method 300, and may be used to conduct an evaporative emissions test responsive to an indicated tire pressure (TP) decrease in the absence of a corresponding barometric pressure (BP) increase, where downhill travel is not indicated, and the vehicle transmission is in neutral. A circumstance where all of the above conditions may be satisfied may include a car wash event, where the tires are suddenly cooled responsive to the tires coming into contact with cold water from the car wash. During such a condition, the cold water may additionally strike/splash the fuel tank, resulting in significant and rapid cooling of the fuel tank. Accordingly, if the evaporative emissions system is sealed, the resulting vacuum build may be used to assess whether undesired evaporative emissions are present in the evaporative emissions system and fuel system. Method 400 will be described with reference to the systems described herein and shown in FIGS. 1-2, though it should be understood that similar methods may be applied to other systems without departing from the scope of this disclosure. Method 400 may be carried out by a controller, such as controller 212 in FIG. 2, and may be stored at the controller as executable instructions in non-transitory memory. Instructions for carrying out method 400 and the rest of the methods included herein may be executed by the controller based on instructions stored on a memory of the controller and in conjunction with signals received from sensors of the vehicle system, such as fuel tank pressure transducer (e.g., 217) described above with reference to FIG. 1. The controller may employ evaporative emissions system actuators such as the canister purge valve (e.g., 261) and the canister vent valve (e.g., 232) to conduct the evaporative emissions test, according to the methods described below. Furthermore, other engine, fuel system, and evaporative emissions system actuators may additionally be employed according to the methods described below. As discussed above, in some examples a fuel tank isolation valve may be included, however in this example method, a fuel tank isolation valve is not included. However, a fuel tank isolation valve may be included without departing from the scope of this disclosure.

Method 400 begins at 405 and may include sealing the evaporative emissions control system. As described above, sealing the evaporative emissions control system at 405 may include closing or maintaining closed the canister purge valve (CPV), and closing or maintaining closed the canister vent valve (CVV). As described above, with regard to FIG. 2, in some examples a fuel tank isolation valve (e.g., 215) may be included in the vehicle system. In such an example, the FTIV may need to be commanded open in order to couple the fuel system to the evaporative emissions system. However, as not all vehicles are equipped with FTIVs, in this example method it may be understood that the vehicle is not equipped with an FTIV, and thus by commanding closed the CVV with the CPV closed, the evaporative emissions system and fuel system may be sealed together. As such, if the fuel tank is rapidly cooled, the resulting vacuum may be applied to the evaporative emissions system as well as the fuel tank, and thus an indication of whether undesired evaporative emissions are present may be made with regard to the evaporative emissions system and fuel system. Furthermore, sealing the evaporative emissions system and fuel system may in some examples be further based on GPS and/or onboard cameras to confirm that the vehicle is in a car wash. In some examples, if GPS and/or onboard cameras indicate that the vehicle is not in a car wash, the evaporative emissions test diagnostic may not be performed, but instead the evaporative emissions system may be sealed as described above with regard to step 324 of method 300, to maintain the integrity of the evaporative emissions control system.

Proceeding to 410, method 400 may include performing the vacuum test. For example, performing the vacuum test may include monitoring pressure in the fuel system and evaporative emissions system for a period of time. Pressure may be monitored until the vacuum reaches a threshold, the threshold vacuum indicative of no undesired emissions above a threshold size in the fuel system and/or evaporative emissions system. The threshold vacuum may be based on the current conditions, including the ambient temperature, the fuel level, the fuel volatility, length and aggressiveness of a previous drive cycle, fuel temperature, time since a previous engine-on condition, etc. In some examples, the rate of pressure change may be compared to an expected rate of pressure change. In such an example, a rate of pressure change within a threshold of an expected pressure change may be indicative of an absence of undesired evaporative emissions. In some examples, the pressure in the fuel system and evaporative emissions system may not reach the threshold vacuum. Rather, the pressure may be monitored for a predetermined amount of time, or an amount of time based on the current conditions.

Continuing at 415, method 400 may include determining whether a passing result was indicated for the vacuum test, such as the vacuum in the fuel system and evaporative emission system reaching a threshold vacuum. If the vacuum test resulted in a passing result, method 400 may proceed to 420. At 420, method 400 may include recording the passing test result at the controller. Alternatively, if the vacuum test did not result in a passing result, method 400 may proceed to 425 and may include recording the negative result at the controller. However, regardless of whether the vacuum test indicated a passing result, or a negative result, it may be understood that some level of vacuum will be present in the evaporative emissions system subsequent to the test being performed. Accordingly, relieving the vacuum while the vehicle may still be in the car wash may not be desirable, as water may be ingested into the evaporative emissions system, and may corrupt the activated charcoal in the fuel vapor canister. As such, following an indication of whether undesired evaporative emissions are indicated, method 400 may proceed to 430. At 430, method 400 may include indicating whether conditions are met for relieving the vacuum build in the evaporative emissions system. In one example, pressure relief conditions may be met responsive to the vehicle transitioning from neutral, to a forward gear state, as would occur when the vehicle exits a car wash event. In another example, if the vehicle is equipped with a global positioning system (GPS), the GPS may be used to indicate when the vehicle is no longer in the car wash. In another example, if the vehicle is equipped with onboard cameras, the cameras may be used to indicate when the vehicle is no longer in the car wash. In yet another example, pressure relief conditions may include an indication that TP has increased to a second threshold, where the second threshold comprises a TP that may indicate that the vehicle has exited a car wash and has begun driving. If, at 430, conditions are not met for relieving the vacuum in the evaporative emissions system and fuel system, method 400 may proceed to 435, and may include maintaining the evaporative emissions system and fuel system sealed by maintaining closed the CVV and the CPV. Alternatively, once conditions are met for relieving the vacuum at 430, method 400 may proceed to 440, and may include commanding open the CVV while maintaining closed the CPV. As such, delaying vacuum-relief until the vehicle is no longer in a condition where water may be ingested into the evaporative emissions system may prevent fuel vapor canister function from becoming compromised.

Proceeding to 445, method 400 may include updating engine operating parameters to reflect the recent evaporative emissions test. In one example, if undesired evaporative emissions were indicated at 425, method 400 may include updating a canister purge schedule. For example, updating the canister purge schedule may include performing purging operations more frequently in order to route fuel vapor to engine intake to be combusted, rather than potentially allowing the fuel vapor to escape to atmosphere. Furthermore, scheduled evaporative emissions tests may be delayed, adjusted, or postponed until it is indicated that the source of undesired evaporative emissions has been mitigated. Alternatively, if undesired evaporative emissions were not indicated at 420, method 400 may include maintaining the canister purge schedule and evaporative emissions test schedule without any changes. Method 400 may then end.

FIG. 5 shows an example timeline 500 for conducting an opportunistic evaporative emissions test diagnostic procedure according to the methods described herein and with reference to FIGS. 3-4, and as applied to the systems described herein and with reference to FIGS. 1-2. Timeline 500 includes plot 505, indicating whether the vehicle transmission is off, or in a forward (F), neutral (N), or reverse (R) gear state, over time. Timeline 500 further includes plot 510, indicating a measured barometric pressure (BP), over time. For example, BP may be indicated via a barometric pressure sensor positioned in the intake manifold of the vehicle engine (e.g., 213). Timeline 500 further includes plot 515, indicating tire pressure in one or more tires, over time. For example, tire pressure may be monitored by one or more tire pressure sensors (e.g., 197) coupled to one or more tires in the vehicle. Line 517 represents a first threshold tire pressure level, comprising a predetermined tire pressure. The predetermined tire pressure may correspond to a tire pressure expected responsive to a predetermined tire temperature decrease. For example, if the one or more tires undergo a predetermined (or greater) level of cooling, it may be expected that the tire pressure may decrease to (or beyond) the first threshold pressure level. Responsive to an indication that the TP has reached or exceeded the first threshold pressure level, without a corresponding increase in BP, in some examples the evaporative emissions system may be sealed and fuel vapor canister purging may be suspended, while in other examples an opportunistic evaporative emissions test may be conducted, as described above with regard to the methods depicted in FIG. 3 and FIG. 4. Line 519 represents a second threshold tire pressure, indicating a tire pressure expected responsive to a predetermined increase in tire temperature. In some examples, described above with regard to the methods depicted in FIG. 3 and FIG. 4, responsive to a TP increase meeting or exceeding the second tire pressure threshold (subsequent to a tire pressure decrease below the first threshold tire pressure level), the evaporative emissions control system and fuel system may be unsealed, pressure in the evaporative emissions system and fuel system may be relieved, and fuel vapor canister purging operations may be resumed. Timeline 500 further includes plot 520, indicating a throttle position, over time. Line 523 represents a threshold amount of throttle opening, indicating a level of throttle opening that may enable reliable readings of BP from the BP sensor. Timeline 500 further includes plot 525, indicating whether the CPV is in an open or closed position, and plot 530, indicating whether the CVV is in an open or closed position, over time. Timeline 500 further includes plot 535, indicating a pressure as measured by a fuel tank pressure transducer (FTPT, e.g., 217), over time. Line 536 represents a predetermined threshold level of vacuum that may indicate the absence of undesired evaporative emissions in the evaporative emissions system and fuel system. Accordingly, timeline 500 further includes plot 540, indicating whether undesired evaporative emissions are indicated, over time. Finally, timeline 500 further includes plot 545, indicating whether the vehicle is indicated to be traveling downhill, over time. An indication of whether the vehicle is traveling downhill may be provided via lateral sensors in the vehicle (e.g., 199), to obtain information on vehicle pitch. Based on the angle of the vehicle it may be determined that the vehicle is traveling down a hill. Additionally or alternatively, an indication of whether the vehicle is traveling downhill may be made via a global positioning system (GPS), if the vehicle is equipped. In another example, a further indication that the vehicle is traveling downhill may be based on vehicle speed compared to TP change. For example, a rapid TP decrease while the vehicle speed is below a threshold may not be consistent with a decrease in vehicle altitude. As described above, in some examples a fuel tank isolation valve may be included in the vehicle, however in this example timeline it may be understood that a fuel tank isolation valve is not included.

At time $t_0$, the vehicle is not in operation, indicated by plot 505. As such, barometric pressure may not be able to be measured accurately by the vehicle, however for reference barometric pressure is indicated by plot 510. As the vehicle is not in operation, tire pressure is at a minimum, indicated by plot 515, and the throttle is closed, indicated by plot 520. The CPV is closed, indicated by plot 525, thus preventing fuel vapors from migrating to the intake manifold during vehicle-off conditions. To direct fuel vapors from the fuel tank to the fuel vapor canister during vehicle-off conditions, the CVV is open, indicated by plot 530. As the CVV is open, thus coupling the fuel vapor canister to atmosphere, pressure as monitored by the FTPT (e.g. 217) is indicated to be near atmospheric pressure, indicated by plot 535. No undesired evaporative emissions are indicated, as illustrated by plot 540, and as the vehicle is not in operation, downhill travel is not indicated, illustrated by plot 545.

At time $t_1$, the vehicle is turned on and begins driving in a forward direction. As the vehicle is in motion, friction due to the interaction with the tires and road or other surface results in heat generation, and thus at time $t_1$ pressure in the tires begins to rise. A canister purging event is not indicated, thus the CPV is maintained closed, and the CVV is maintained open. As such, pressure as monitored by the FTPT remains near atmospheric pressure. Furthermore, in this example illustration it may be understood that the vehicle is being powered via an engine, and thus as the vehicle begins traveling forward the throttle position is indicated to begin changing in response to vehicle operator demand.

Between time $t_1$ and $t_2$, tire pressure is indicated to rise and plateau, and throttle position is continually adjusted based on vehicle operator demand. When the throttle is open greater than a threshold amount, the threshold represented by line 520, accurate BP measurement may be obtained by the barometric pressure sensor (e.g., 213), positioned in the engine intake manifold, as described above. While the vehicle is in operation and in the absence of a canister purging event, the CVV may be maintained open, and the CPV closed, such that running loss fuel vapors may be directed to the fuel vapor canister for storage prior to exiting to atmosphere.

At time $t_2$, the vehicle is indicated to change transmission gear state from forward (drive), to neutral. The throttle is indicated to be mainly closed, and thus it may be understood that the vehicle has come to a stop and that the vehicle has been transitioned into neutral. At time $t_3$, with the vehicle in neutral, a sudden tire pressure drop begins. Between time $t_3$ and $t_4$, tire pressure is indicated to rapidly decrease, and at time $t_4$ tire pressure is indicated to reach the first threshold tire pressure level, indicated by line 517. Because throttle position was below the threshold where an accurate BP measurement may be obtained via the barometric pressure sensor (e.g., 213), it may be determined whether the vehicle is indicated to be traveling downhill. As described above, it may be indicated whether the vehicle is traveling downhill based on lateral sensors, GPS (if the vehicle is equipped), vehicle speed, etc. As downhill travel is not indicated, as illustrated by plot 545, it is likely that the tire pressure drop resulted from an exposure of the tires to cold water, such as might happen in a car wash event. Under such circumstances, if the vehicle is equipped with a GPS, or onboard cameras, confirmation of whether the vehicle is in a car wash may be provided based on vehicle location and/or object recognition software utilized by the onboard cameras. Accordingly, at time $t_4$ it may be indicated that a car wash event is in progress, and as such, an opportunistic evaporative emissions test may be conducted as it is likely that the fuel tank will be exposed to cold water and thus significant vacuum may develop in the fuel system and evaporative emissions system of the vehicle, if the fuel system and evaporative emissions system is sealed from atmosphere.

As such, at time $t_4$, the CVV is commanded closed, indicated by plot 530. With the CVV closed, the evaporative emissions system (e.g., 219) and fuel system (e.g., 218) may be sealed from atmosphere. As described above, in some examples a fuel tank isolation valve (e.g., 215) may be included in the vehicle. In such an example, the FTIV may need to be commanded open prior to sealing the fuel system and evaporative emissions system by closing the CVV, to couple the fuel system to the evaporative emissions system. However, in this example timeline illustration, it may be understood that the vehicle is not equipped with a FTIV. However, a FTIV may be included without departing from the scope of the present disclosure.

With the fuel system and evaporative emissions system sealed from atmosphere, pressure as monitored by the FTPT is indicated to drop between time $t_4$ and $t_5$ due to the fuel tank rapidly cooling as a result of being exposed to cold water from the car wash event. At time $t_5$, pressure in the evaporative emissions system and fuel system reaches the predetermined threshold level of vacuum indicative of an absence of undesired evaporative emissions. Accordingly, undesired evaporative emissions are not indicated, as illustrated by plot 540, and the passing result may be stored at the controller, as described above.

However, responsive to the passing result, or even in a case where undesired evaporative emissions were indicated, the CVV may not be commanded open until it is indicated that the vehicle has exited the car wash. For example, as described above, if the evaporative emissions test is conducted and there is significant vacuum in the fuel system and evaporative emissions system, then if the CVV were to be commanded open while the vehicle is still in the car wash event, water may be ingested into the evaporative emissions system and may thus corrupt the fuel vapor canister. As such, while the vacuum build in the evaporative emissions system and fuel system is indicated to reach the predetermined threshold at time $t_5$, the CVV is maintained closed as the vehicle is still indicated to be in neutral between time $t_5$ and $t_6$.

At time $t_6$, the vehicle is indicated to transition from neutral to a forward gear state, as illustrated by plot 505. Accordingly, it may be determined that the vehicle has exited the car wash. As such, the evaporative emissions system and fuel system may be unsealed from atmosphere, by commanding open the CVV, illustrated by plot 530. As described above, in some examples conditions for relieving the pressure in the evaporative emissions system may additionally or alternatively include the use of GPS (if equipped) to indicate that the vehicle is no longer in the car wash, or an indication that TP has reached a second threshold, the second TP threshold indicating that the vehicle has exited the car wash and has begun driving.

With the CVV commanded open at time $t_6$, between time $t_6$ and $t_7$ pressure in the evaporative emissions system and fuel system returns to atmospheric pressure, indicated by plot 535. Furthermore, as the vehicle is traveling in a forward direction, tire pressure is indicated to increase as a result of friction between the wheels and the road generating heat that translates into increased tire pressure. Additionally, throttle position is indicated to fluctuate responsive to vehicle operator demand.

In this way, an opportunistic evaporative emissions test may be conducted during conditions wherein a vacuum build in the evaporative emissions system and fuel system is likely to enable a robust determination of whether or not undesired emissions are present in the evaporative emissions system and fuel system. As noted above, in certain vehicle types such as hybrid electric vehicles (HEVs), plug-in hybrid electric vehicles (PHEVs), and start-stop (S/S) vehicles, engine run-time may be limited and thus opportunities for evaporative emissions tests may be limited. This may result in an inability to meet In Use Monitoring Performance (LUMP) completion frequency requirements under some circumstances. As such, it is desirable to conduct an evaporative emissions test under any circumstance where robust results are likely. One such example includes a car wash event, as described above, where the fuel tank may be exposed to cold water and thus a rapid cooling of the fuel tank may occur. As vehicle operators frequently wash their vehicles in car wash operations, conducting evaporative emissions tests under such conditions may enhance evaporative emissions test completion rates, thus preventing unnecessary vehicle recall.

The technical effect is to recognize that tire pressure sensors may indicate a rapid tire cooling event, which may be correlated with a vehicle in a car wash. In order to increase confidence that the vehicle is in fact, in a car wash condition, tire pressure may be compared with an indication of barometric pressure, an indication of whether the vehicle is traveling downhill, an indication of vehicle speed, and an indication of vehicle transmission gear state. Other ways of increasing confidence that the vehicle is in a car wash may include the use of GPS and/or onboard cameras (if the vehicle is equipped with GPS and/or onboard cameras). By basing entry conditions into an evaporative emissions test on a tire pressure decrease greater than a predetermined threshold, it is likely that the fuel tank may experience significant cooling such that a vacuum-based evaporative emissions test is likely to be robust. Furthermore, sealing the evaporative emissions system and fuel system during a car wash event in order to conduct an evaporative emissions test may additionally serve to preserve the integrity of the fuel vapor canister. Accordingly, by opportunistically conducting an evaporative emissions test during a car wash event, test completion rates may be increased, vehicle emissions reduced, and potential losses in canister integrity prevented.

The systems described herein and with reference to FIGS. 1-2, along with the methods described here and with reference to FIGS. 3-4, may enable one or more systems and one or more methods. In one example, a method comprises responsive to an indication that a vehicle is in the process of a car wash event; sealing a fuel system which supplies fuel to an engine propelling the vehicle and an evaporative emissions system coupled to the fuel system; and conducting a diagnostic test for the presence of undesired evaporative emissions. In a first example of the method, the method further comprises monitoring pressure in one or more tires of the vehicle; and wherein indicating that the vehicle is in the process of a car wash event includes indicating a tire pressure decrease greater than a predetermined threshold. A second example of the method optionally includes the first example and further comprises monitoring barometric pressure via a barometric pressure sensor positioned in an intake manifold of the engine; and wherein indicating that the vehicle is in the process of a car wash event includes an absence of change in barometric pressure. A third example of the method optionally includes any one or more or each of the first and second examples and further comprises controlling an intake air amount inducted into the engine intake manifold via a throttle; and wherein an absence of change in barometric pressure includes indicating that a throttle position is below a throttle position threshold. A fourth example of the method optionally includes any one or more or each of the first through third examples and further comprises monitoring vehicle pitch angle via one or more lateral sensors in the vehicle; and wherein indicating that the vehicle is in the process of a car wash event includes indicating that the vehicle pitch angle is less than a threshold pitch angle. A fifth example of the method optionally includes any one or more or each of the first through fourth examples and further includes wherein indicating that the vehicle is in the process of a car wash event includes indicating that a transmission of the vehicle is in a neutral gear state. A sixth example of the method optionally includes any one or more or each of the first through fifth examples and further includes wherein the fuel system includes a fuel tank that supplies fuel to the engine, and the evaporative emissions system includes a fuel vapor canister configured to capture and store fuel vapors from the fuel tank; and wherein sealing the fuel system and evaporative emissions system comprises sealing the fuel system and evaporative emission system from atmosphere and from the engine; and wherein a fuel tank temperature decrease during the car wash event results in a vacuum build in the fuel system and evaporative emissions system. A seventh example of the method optionally includes any one or more or each of the first through sixth examples and further includes wherein conducting the diagnostic test for the presence of undesired evaporative emissions includes indicating an absence of undesired evaporative emissions responsive to a vacuum build in the fuel system and evaporative emissions system greater than a predetermine vacuum threshold, or a rate of vacuum build greater than a predetermined threshold vacuum build rate. An eighth example of the method optionally includes any one or more or each of the first through seventh examples and further comprises wherein indicating that the vehicle is in the process of a car wash event further comprises: indicating the car wash event based on one or more of a vehicle global positioning system (GPS) and onboard camera(s).

An example of a system for a vehicle comprises an engine; a fuel tank, configured within a fuel system which supplies fuel to the engine; a fuel vapor canister, configured within an evaporative emissions control system, fluidically coupled to an engine intake manifold via a canister purge valve, fluidically coupled to atmosphere via a canister vent valve; and fluidically coupled to the fuel tank; a barometric pressure sensor in the engine intake manifold; one or more tire pressure sensors coupled to one or more tires of the vehicle; a controller storing instructions in non-transitory memory, that when executed, cause the controller to: monitor tire pressure in the one or more vehicle tires; monitor barometric pressure via the barometric pressure sensor; and responsive to an indication of a tire pressure decrease greater than a predetermined threshold and an absence of barometric pressure change: in a first condition, seal the evaporative emissions system and fuel system from atmosphere and from the engine intake manifold by commanding closed the canister vent valve and canister purge valve without conducting an evaporative emissions test diagnostic on the fuel system and evaporative emissions system; and in a second condition, seal the evaporative emissions system and fuel system from atmosphere and from the engine intake manifold by commanding closed the canister vent valve and canister purge valve and conduct an evaporative emissions test diagnostic on the fuel system and evaporative emissions system. In a first example, the system further comprises an intake throttle coupled to the engine intake manifold; one or more lateral sensors; and wherein the controller further stores instructions in non-transitory memory, that when executed, cause the controller to: control an intake air amount inducted into the engine intake manifold via the throttle; monitor vehicle pitch angle via the one or more lateral sensors in the vehicle, wherein a vehicle pitch angle greater than a threshold pitch angle indicates the vehicle is traveling downhill; and wherein the first condition includes a throttle position greater than a throttle position threshold, or the throttle position less than the throttle position threshold, the vehicle pitch angle less than the threshold pitch angle, and an indication that the vehicle is not in a neutral transmission gear state; wherein the second condition includes the throttle position less than the throttle position threshold, the vehicle pitch angle less than the threshold pitch angle, and an indication that the vehicle is in a neutral transmission gear state; and wherein the throttle position greater than the throttle position threshold indicates accurate barometric pressure readings as monitored by the barometric pressure sensor. A second example of the system optionally includes the first example and further includes wherein the controller further stores instructions in non-transitory memory, that when executed, cause the controller to: responsive to an indication of tire pressure decrease greater than the predetermined threshold and a corresponding barometric pressure change: adjust engine operating parameters based on barometric pressure change; and responsive to an indication of tire pressure decrease greater than the predetermined threshold, the absence of barometric pressure change, the throttle position less than the throttle position threshold, and the vehicle pitch angle greater than the threshold pitch angle: adjust engine operating parameters based on tire pressure change. A third example of the system optionally includes any one or more or each of the first and second examples and further includes wherein the controller further stores instructions in non-transitory memory, that when executed, cause the controller to: during the first condition, monitor tire pressure in the one or more vehicle tires; and responsive to a tire pressure increase greater than a predetermined threshold: unseal the evaporative emissions system and fuel system from atmosphere by commanding open the canister vent valve. A fourth example of the system optionally includes any one or more or each of the first through third examples and further comprises a fuel tank pressure transducer; and wherein the controller further stores instructions in non-transitory memory, that when executed, cause the controller to: during the second condition, monitor pressure in the fuel system and evaporative emissions system; and indicate an absence of undesired evaporative emissions responsive to vacuum in the fuel system and evaporative emissions system reaching a threshold vacuum, or responsive to a rate of vacuum build in the fuel system and evaporative emissions system greater than a predetermined threshold vacuum build rate. A fifth example of the system optionally includes any one or more or each of the first through fourth examples and further includes wherein the controller further stores instructions in non-transitory memory, that when executed, cause the controller to: adjust the threshold vacuum or threshold vacuum build rate based on one or more of ambient temperature, fuel tank fill level, fuel volatility, fuel temperature, or length and aggressiveness of a previous drive cycle. A sixth example of the system optionally includes any one or more or each of the first through fifth examples and further comprises an onboard global positioning system (GPS); onboard cameras; and wherein the controller further stores instructions in non-transitory memory, that when executed, cause the controller to: in the second condition, seal the evaporative emissions system and fuel system from atmosphere and from the engine intake manifold and conduct the evaporative emissions test diagnostic on the fuel system and evaporative emissions system responsive to an indication that the vehicle is in a car wash; wherein indicating that the vehicle is in a car wash is based on GPS and/or the onboard cameras. A seventh example of the system optionally includes any one or more or each of the first through sixth examples and further includes wherein the controller further stores instructions in non-transitory memory, that when executed, cause the controller to: maintain sealed the evaporative emissions system and fuel system from atmosphere and from the engine intake manifold upon completion of the evaporative emissions test diagnostic until at least an indication of the vehicle transitioning from neutral to a forward gear state, an indication that the vehicle is no longer in the car wash based on GPS and/or the onboard cameras, or an indication that tire pressure has increased to a second threshold, the second threshold comprising a tire pressure indicating that the vehicle has exited the car wash and has begun driving.

Another example of a method comprises supplying fuel from a fuel tank to an engine which drives the vehicle; storing fuel vapors from the fuel tank in an evaporative emissions system; indicating conditions that the fuel tank is rapidly cooled by cold water striking the fuel tank; and conducting an evaporative emissions test diagnostic procedure of the fuel tank and evaporative emission system responsive to the rapid cooling of the fuel tank. In a first example of the method, the method further comprises monitoring pressure in one or more tires of the vehicle; monitoring barometric pressure via a barometric pressure sensor positioned in an intake manifold of the engine; monitoring vehicle pitch angle via one or more lateral sensors in the vehicle; and wherein indicating conditions that the fuel tank is rapidly cooled further comprises: a tire pressure decrease greater than a predetermined threshold; an absence of change in barometric pressure; the vehicle pitch angle less than a threshold vehicle pitch angle; and an indication that a transmission coupled to the engine is in a neutral gear state. A second example of the method optionally includes the first example and further includes wherein cold water striking the fuel tank occurs during a car wash event; wherein indicating the car wash event is further based on one or more of a vehicle global positioning system (GPS), and onboard camera(s); and wherein conducting the evaporative emissions test diagnostic procedure responsive to the rapid cooling of the fuel tank further comprises: sealing the fuel system and the evaporative emissions system from atmosphere and from an intake manifold of the engine, wherein the evaporative emissions system includes a fuel vapor canister for capturing and storing fuel vapors; and indicating an absence of undesired evaporative emissions from the fuel system and evaporative emissions system responsive to a vacuum build in the fuel system and evaporative emissions system reaching a predetermined threshold vacuum, or responsive to a rate of vacuum build greater than a predetermined threshold vacuum build rate.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
responsive to an indication that a vehicle is in the process of a car wash event;
sealing a fuel system which supplies fuel to an engine propelling the vehicle and an evaporative emissions system coupled to the fuel system; and
conducting a diagnostic test for the presence of undesired evaporative emissions.

2. The method of claim 1, further comprising:
monitoring pressure in one or more tires of the vehicle; and wherein
indicating that the vehicle is in the process of a car wash event includes indicating a tire pressure decrease greater than a predetermined threshold.

3. The method of claim 1, further comprising;
monitoring barometric pressure via a barometric pressure sensor positioned in an intake manifold of the engine; and wherein
indicating that the vehicle is in the process of a car wash event includes an absence of change in barometric pressure.

4. The method of claim 3, further comprising:
controlling an intake air amount inducted into the engine intake manifold via a throttle; and wherein
an absence of change in barometric pressure includes indicating that a throttle position is below a throttle position threshold.

5. The method of claim 1, further comprising:
monitoring vehicle pitch angle via one or more lateral sensors in the vehicle; and wherein indicating that the vehicle is in the process of a car wash event includes indicating that the vehicle pitch angle is less than a threshold pitch angle.

6. The method of claim 1, wherein indicating that the vehicle is in the process of a car wash event includes indicating that a transmission of the vehicle is in a neutral gear state.

7. The method of claim 1, wherein the fuel system includes a fuel tank that supplies fuel to the engine, and the evaporative emissions system includes a fuel vapor canister configured to capture and store fuel vapors from the fuel tank; and wherein sealing the fuel system and evaporative emissions system comprises sealing the fuel system and evaporative emission system from atmosphere and from the engine; and wherein
a fuel tank temperature decrease during the car wash event results in a vacuum build in the fuel system and evaporative emissions system.

8. The method of claim 7, wherein conducting the diagnostic test for the presence of undesired evaporative emissions includes indicating an absence of undesired evaporative emissions responsive to a vacuum build in the fuel system and evaporative emissions system greater than a predetermine vacuum threshold, or a rate of vacuum build greater than a predetermined threshold vacuum build rate.

9. The method of claim 1, wherein indicating that the vehicle is in the process of a car wash event further comprises:
indicating the car wash event based on one or more of a vehicle global positioning system (GPS) and onboard camera(s).

10. A system for a vehicle, comprising:
an engine;
a fuel tank, configured within a fuel system which supplies fuel to the engine;
a fuel vapor canister, configured within an evaporative emissions control system, fluidically coupled to an engine intake manifold via a canister purge valve, fluidically coupled to atmosphere via a canister vent valve; and fluidically coupled to the fuel tank;
a barometric pressure sensor in the engine intake manifold;
one or more tire pressure sensors coupled to one or more tires of the vehicle;
a controller storing instructions in non-transitory memory, that when executed, cause the controller to:
monitor tire pressure in the one or more vehicle tires;
monitor barometric pressure via the barometric pressure sensor; and
responsive to an indication of a tire pressure decrease greater than a predetermined threshold and an absence of barometric pressure change:
in a first condition, seal the evaporative emissions system and fuel system from atmosphere and from the engine intake manifold by commanding closed the canister vent valve and canister purge valve without conducting an evaporative emissions test diagnostic on the fuel system and evaporative emissions system; and
in a second condition, seal the evaporative emissions system and fuel system from atmosphere and from the engine intake manifold by commanding closed the canister vent valve and canister purge valve and conduct an evaporative emissions test diagnostic on the fuel system and evaporative emissions system.

11. The system of claim 10, further comprising:
an intake throttle coupled to the engine intake manifold;
one or more lateral sensors; and wherein
the controller further stores instructions in non-transitory memory, that when executed, cause the controller to:
control an intake air amount inducted into the engine intake manifold via the throttle;
monitor vehicle pitch angle via the one or more lateral sensors in the vehicle, wherein a vehicle pitch angle greater than a threshold pitch angle indicates the vehicle is traveling downhill; and
wherein the first condition includes a throttle position greater than a throttle position threshold, or the throttle position less than the throttle position threshold, the vehicle pitch angle less than the threshold pitch angle, and an indication that the vehicle is not in a neutral transmission gear state;

wherein the second condition includes the throttle position less than the throttle position threshold, the vehicle pitch angle less than the threshold pitch angle, and an indication that the vehicle is in a neutral transmission gear state; and wherein the throttle position greater than the throttle position threshold indicates accurate barometric pressure readings as monitored by the barometric pressure sensor.

12. The system of claim 11, wherein the controller further stores instructions in non-transitory memory, that when executed, cause the controller to:

responsive to an indication of tire pressure decrease greater than the predetermined threshold and a corresponding barometric pressure change:
adjust engine operating parameters based on barometric pressure change; and responsive to an indication of tire pressure decrease greater than the predetermined threshold, the absence of barometric pressure change, the throttle position less than the throttle position threshold, and the vehicle pitch angle greater than the threshold pitch angle:
adjust engine operating parameters based on tire pressure change.

13. The system of claim 10, wherein the controller further stores instructions in non-transitory memory, that when executed, cause the controller to:

during the first condition, monitor tire pressure in the one or more vehicle tires; and responsive to a tire pressure increase greater than a predetermined threshold:

unseal the evaporative emissions system and fuel system from atmosphere by commanding open the canister vent valve.

14. The system of claim 10, further comprising:
a fuel tank pressure transducer; and wherein
the controller further stores instructions in non-transitory memory, that when executed, cause the controller to:
during the second condition, monitor pressure in the fuel system and evaporative emissions system; and
indicate an absence of undesired evaporative emissions responsive to vacuum in the fuel system and evaporative emissions system reaching a threshold vacuum, or responsive to a rate of vacuum build in the fuel system and evaporative emissions system greater than a predetermined threshold vacuum build rate.

15. The system of claim 14, wherein the controller further stores instructions in non-transitory memory, that when executed, cause the controller to:
adjust the threshold vacuum or threshold vacuum build rate based on one or more of ambient temperature, fuel tank fill level, fuel volatility, fuel temperature, or length and aggressiveness of a previous drive cycle.

16. The system of claim 11, further comprising:
an onboard global positioning system (GPS);
onboard cameras; and wherein
the controller further stores instructions in non-transitory memory, that when executed, cause the controller to:
in the second condition, seal the evaporative emissions system and fuel system from atmosphere and from the engine intake manifold and conduct the evaporative emissions test diagnostic on the fuel system and evaporative emissions system responsive to an indication that the vehicle is in a car wash;
wherein indicating that the vehicle is in a car wash is based on GPS and/or the onboard cameras.

17. The system of claim 16, wherein the controller further stores instructions in non-transitory memory, that when executed, cause the controller to:
maintain sealed the evaporative emissions system and fuel system from atmosphere and from the engine intake manifold upon completion of the evaporative emissions test diagnostic until at least an indication of the vehicle transitioning from neutral to a forward gear state, an indication that the vehicle is no longer in the car wash based on GPS and/or the onboard cameras, or an indication that tire pressure has increased to a second threshold, the second threshold comprising a tire pressure indicating that the vehicle has exited the car wash and has begun driving.

18. A method for a vehicle comprising:
supplying fuel from a fuel tank to an engine which drives the vehicle;
storing fuel vapors from the fuel tank in an evaporative emissions system;
indicating conditions that the fuel tank is rapidly cooled by cold water striking the fuel tank; and
conducting an evaporative emissions test diagnostic procedure of the fuel tank and evaporative emission system responsive to the rapid cooling of the fuel tank.

19. The method of claim 18, further comprising:
monitoring pressure in one or more tires of the vehicle;
monitoring barometric pressure via a barometric pressure sensor positioned in an intake manifold of the engine;
monitoring vehicle pitch angle via one or more lateral sensors in the vehicle; and wherein
indicating conditions that the fuel tank is rapidly cooled further comprises:
a tire pressure decrease greater than a predetermined threshold;
an absence of change in barometric pressure;
the vehicle pitch angle less than a threshold vehicle pitch angle; and
an indication that a transmission coupled to the engine is in a neutral gear state.

20. The method of claim 18, wherein cold water striking the fuel tank occurs during a car wash event;
wherein indicating the car wash event is further based on one or more of a vehicle global positioning system (GPS), and onboard camera(s); and wherein
conducting the evaporative emissions test diagnostic procedure responsive to the rapid cooling of the fuel tank further comprises:
sealing the fuel system and the evaporative emissions system from atmosphere and from an intake manifold of the engine, wherein the evaporative emissions system includes a fuel vapor canister for capturing and storing fuel vapors; and
indicating an absence of undesired evaporative emissions from the fuel system and evaporative emissions system responsive to a vacuum build in the fuel system and evaporative emissions system reaching a predetermined threshold vacuum, or responsive to a rate of vacuum build greater than a predetermined threshold vacuum build rate.

* * * * *